O. J. HARDGROVE.
Horse Rake.
No. 41,990. Patented March 22, 1864.
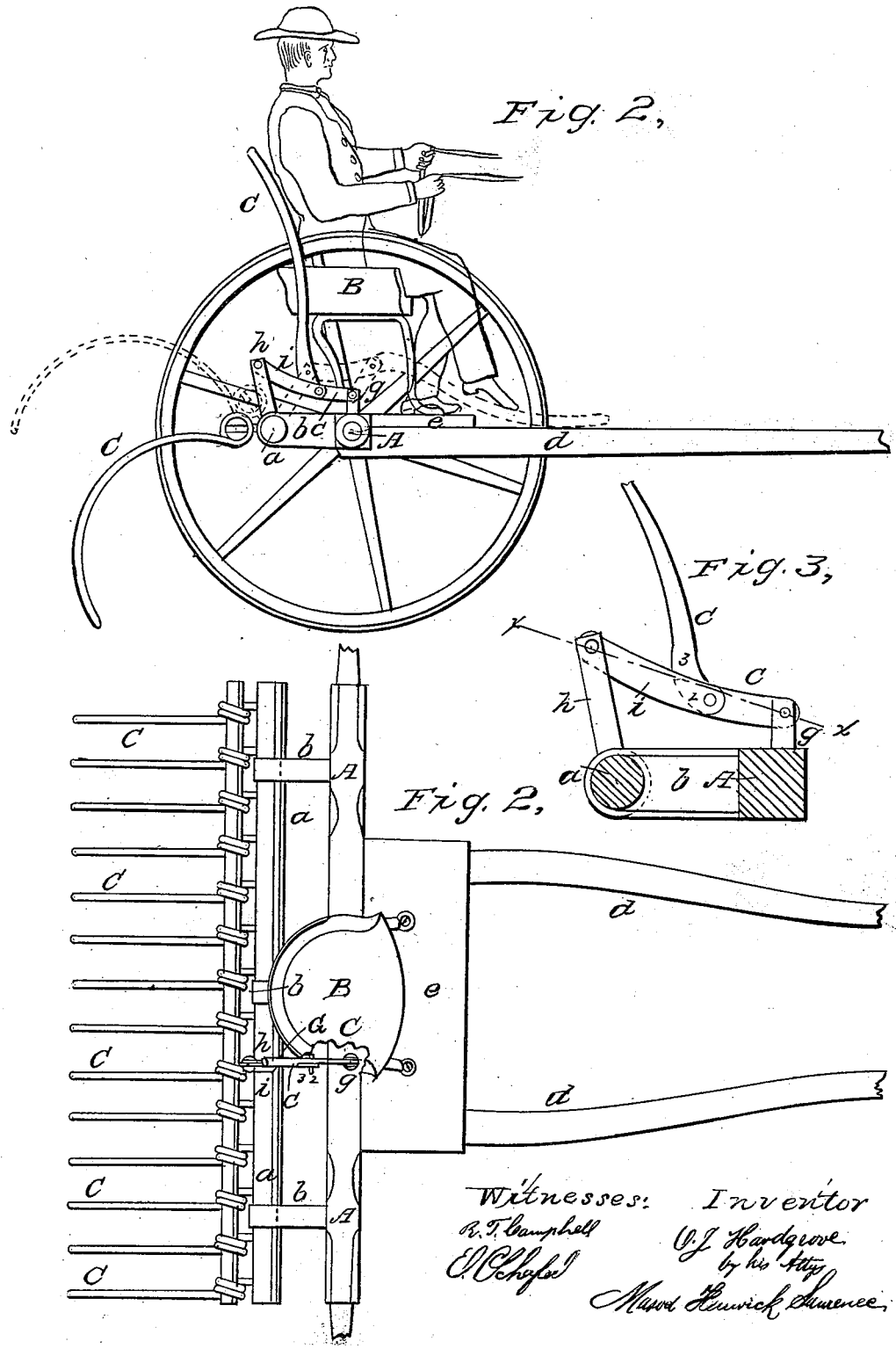

UNITED STATES PATENT OFFICE.

O. J. HARDGROVE, OF MASSILLON, OHIO.

IMPROVEMENT IN HORSE-RAKES.

Specification forming part of Letters Patent No. 41,990, dated March 22, 1864.

*To all whom it may concern:*

Be it known that I, O. J. HARDGROVE, of Massillon, in the county of Stark and State of Ohio, have invented a new and useful Improvement in Horse-Rakes; and I do hereby declare that the following is a full, clear, and exact description thereof, reference being had to the accompanying drawings, making a part of this specification, in which—

Figure 1 is a side elevation of the improved machine, having one wheel removed to show the rake and levers. Fig. 2 is a top view of Fig. 1. Fig. 3 is an enlarged view of the locking-levers, which are used to operate the rake.

Similar letters of reference indicate corresponding parts in the three figures.

This invention and improvement in wheel horse-rakes has for its object the raising and depressing, or the throwing into and out of action, of the rake by means of a very simple, cheap, and easily-manipulated device, which automatically locks the rake in position when down, and enables the driver to keep the rake in an elevated position in transporting the machine from one place to another, as will be hereinafter described.

To enable others skilled in the art to make and use my invention, I will describe its construction and operation.

In the accompanying drawings I have represented my invention applied to a hay-raking machine having the transverse rocking bar to which the rake teeth or tines are affixed supported by three or more arms, $b$ $b$, which project out behind the axle-tree A, and which are rigidly fixed to this axle. These arms $b$ $b$ support the rocking bar $a$ in a position parallel to the axle-tree, and to this bar $a$ the tines $c$ are all attached in any suitable manner. In the present instance the ends of the tines are secured into their rocking bar or rake-head, and a spiral eye is formed on the upper end of each tooth for giving elasticity thereto. Semi-cylindrical strips are then inserted through all the eyes of the teeth, and in this manner they are secured from twisting and the teeth prevented from working laterally out of place.

The thills $d$ $d$ are secured to the axle-tree A, and a board, $e$, being nailed on top of the thills so as to abut against and be flush with the axle-tree, this board serves as a platform for supporting the driver's seat B and for the feet of the driver to rest upon.

On one side of the driver's seat B, and projecting perpendicularly from the axle-tree A, is a short post, $g$, and directly in a line with this post is an arm, $h$, which is fixed to and projects up from the rocking bar or rake-head $a$.

This arm $h$ may be screwed into the rake-head $a$, so that it can be adjusted, or lengthened, or shortened at pleasure, and to the upper end of this arm $h$ one end of a short arm, $i$, is pivoted, the opposite end of which is pivoted to a curved lever, C, at 2; and this curved lever has its lower end pivoted to the short post $g$, as shown clearly in Figs. 1 and 3. This arrangement of arms forms what is known as "toggle-levers", and it is now desired to make these toggle-levers in such manner that when the long lever C is thrown back and the rake depressed to the desired point the levers will lock themselves and prevent the rake from being casually thrown up when the machine is in operation, while at the same time the long lever C shall maintain a position to be readily grasped by the hand of the operator, as shown in Fig. 1, whenever it is desirable to throw the machine out of operation. To effect this object I make the joints of such length that the fulcrum or point 2 will fall below the line $x$ $x$, Fig. 3, when the points of the tines touch the ground. Thus it will be observed that any upward pressure on the tines would only tend to lock them down more firmly by drawing the shoulder 3, which is formed on lever C, down on the jointed arm $i$, as shown in Fig. 3. The shoulder 3 on lever C keeps the intermediate pivot-joint of the toggles from falling below the point indicated in the drawings, and consequently forms a lock for holding the rake down in operating position.

It will be seen that the shoulder 3 is in such a position on lever C that when the rake is checked this lever will be left in a position where it can be readily grasped by the driver sitting in the seat B, who, when he wants to throw up his rake, forces the upper end of lever C forward; and when he desires to keep the rake in an elevated position for any considerable length of time, the lever C is brought down upon the frame of the machine and held by the foot, as indicated in red lines, Fig. 1. In this way and by these means I not only place under the control of the driver a powerful leverage, which he can use to advantage for raising and lowering the rake, but I secure in the most simple manner a lock which operates automatically for keeping the rake down in place.

Having thus described my invention, what I claim as new, and desire to secure by Letters Patent, is—

The combination, with a vibrating rake, of a vibrating lever, C, constructed with a locking shoulder, 3, pivoted arm $i$, and vibrating arm $h$, operating substantially as and for the purposes described.

O. J. HARDGROVE.

Witnesses:
LEVI FULTMOR,
SAMUEL L. MYERS,
EDWIN JARVIS.